No. 675,099.  
W. R. MILLER.  
AXLE FOR VEHICLES.  
(Application filed Mar. 25, 1901.)
Patented May 28, 1901.
(No Model.)
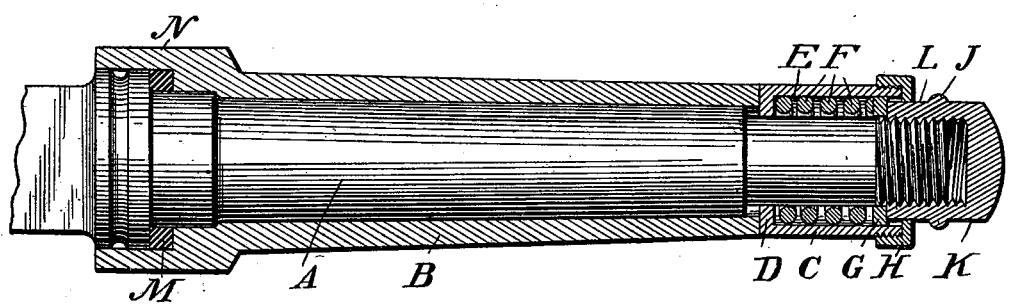
Witnesses:  
H. D. B. Williams  
Louis McCrury
Inventor,  
Walter R. Miller  
By Thos. E. Barrow  
Atty

UNITED STATES PATENT OFFICE.

WALTER R. MILLER, OF BELLVILLE, OHIO.

AXLE FOR VEHICLES.

SPECIFICATION forming part of Letters Patent No. 675,099, dated May 28, 1901.

Application filed March 25, 1901. Serial No. 52,824. (No model.)

*To all whom it may concern:*

Be it known that I, WALTER R. MILLER, a citizen of the United States, residing at Bellville, in the county of Richland and State of Ohio, have invented certain new and useful Improvements in Axles for Vehicles, of which the following is a specification.

My invention relates to improvements in axle for vehicles; and the objects of my invention are to provide a means for retaining the wheel upon the axle by placing a spring-cushion between the outer end of the box and the nut and at the same time to allow a free movement of the wheel upon the axle. It is also designed to take up all end wear and obviate the necessity of changing the leather washers to accomplish the said result.

These objects I accomplish by the mechanism illustrated in the accompanying drawing, in which the figure is a side view showing one end of an axle, the box, nut, and my improved spring device shown in section.

Letters of reference indicate the several parts throughout the view.

In the accompanying drawing, A indicates the axle, and B the skein or box, which are now in general use. The part constituting my invention is composed of the sleeve C, provided at one end with the head D, having an opening through its center sufficiently large to receive the small end of the axle A. The said sleeve is as large in diameter as the small end of the box B. A chamber E is formed between the axle and the inner periphery of the sleeve C. A steel coil-spring F surrounds the axle and is placed within the sleeve C. A loose washer G is placed within the sleeve and bears against the outer end of the coil-spring. To prevent the washer and coil-spring from falling out of the sleeve C when the same is removed from the axle, I have provided a cap H, which is threaded upon the inside and is screwed upon the end of the sleeve.

The nut J is somewhat different in form to those now in general use, as it is not necessary to use the washer-flange. The outer end is square to conform to the common vehicle-wrench. The inner end L is made round, so that it will pass through the opening in the sleeve-cap H.

A leather washer M should be placed within the large end of the box N to bear against the axle-collar to prevent the metals from coming in contact with each other.

The wheel is first placed upon the axle A; then the sleeve C, with the spring F and washer G, inclosed. The nut J is then screwed upon the axle, the inner face bearing against the face of the washer G, forcing the spring against the head of the sleeve and the sleeve against the outer end of the box. The spring, by the action of the nut, can be compressed to give any tension required and take up all end wear and movement.

Having fully illustrated and described my invention, what I claim as new, and desire to secure by Letters Patent, is—

In combination with an axle for vehicles provided upon its outer end with right or left hand threads, and a suitable boxing, a sleeve provided at one end with an inwardly-projecting flange or rim, a coil-spring placed within said sleeve, a loose washer placed between the spring and nut, the whole surrounding the outer end of the axle, a cap screwed upon the end of the sleeve, a nut formed square upon the outer end, and round upon the inner end, the nut adapted to bear against the loose washer to compress the spring, and force the sleeve against the outer end of the boxing, substantially as described.

In testimony whereof I affix my signature in presence of two witnesses.

WALTER R. MILLER.

Witnesses:
JAMES M. REED,
LOUIS L. MCCRAY.